United States Patent [19]
Grenier

[11] Patent Number: 5,695,224
[45] Date of Patent: Dec. 9, 1997

[54] PIPE JOINT ASSEMBLY

[75] Inventor: Wilfred J. Grenier, Rutland, Mass.

[73] Assignee: The Rovac Corporation, Rochdale, Mass.

[21] Appl. No.: 514,868

[22] Filed: Aug. 14, 1995

[51] Int. Cl.$^6$ ............................................. F16L 17/00
[52] U.S. Cl. ......................... 285/104; 285/308; 285/340
[58] Field of Search ........................... 285/340, 84, 104, 285/308

[56] References Cited

U.S. PATENT DOCUMENTS

| | | | |
|---|---|---|---|
| 3,837,687 | 9/1974 | Leonard | 285/340 X |
| 3,879,065 | 4/1975 | Kobayashi | 285/340 X |
| 4,288,113 | 9/1981 | Saulnier | 285/308 X |
| 4,722,558 | 2/1988 | Badoureaux | 285/340 X |
| 5,292,157 | 3/1994 | Rubichon | 285/340 X |
| 5,487,572 | 1/1996 | Combot-Courrau et al. | 285/340 X |
| 5,553,901 | 9/1996 | Serot | 285/308 |

*Primary Examiner*—Terry Lee Melius
*Assistant Examiner*—Heather Shackelford
*Attorney, Agent, or Firm*—Brian M. Dingman

[57] ABSTRACT

A coupling assembly for a first tubular member, comprising: a receiving member defining an opening adapted to receive the first tubular member, and having an inner portion defining an inner bore dimensioned to receive an end portion of the first tubular member, and an outer portion defining a first internal annular cavity communicating with the inner bore and having a diameter greater than the diameter of the inner bore; an annular locking member having an outer rim portion fitted within the first internal annular cavity, and having an inner portion of generally frustoconical shape angled inboard from its outer rim portion such that its inner rim extends in its relaxed position into the inner bore so that the inner rim contacts and penetrates the outer surface of the first tubular member when the first tubular member is inserted into the inner bore, to inhibit separation of the first tubular member from the receiving member; a stop member abutting the outboard side of the outer rim portion of the locking member and adapted to prevent the locking member from longitudinal outboard movement along the internal annular cavity; and a deformable annular sealing member within the receiving member inboard of the locking member, and extending in a relaxed position into the inner bore to contact the first tubular member when the first tubular member is inserted into the inner bore, to inhibit fluid leakage from the first tubular member toward the annular locking member.

15 Claims, 6 Drawing Sheets

PIPE JOINT ASSEMBLY

FIELD OF INVENTION

This invention relates to an easily assembled and disassembled fluid-tight pipe coupling assembly that is relatively simple and inexpensive to manufacture.

BACKGROUND OF THE INVENTION

There are many methods of connecting metal and plastic pipe and tubing to fittings and valves, including threaded connectors, soldering, compression fitting, flaring, welding, and adhesives for plastic pipe. These methods are typically relatively complex and require the services of a skilled technician. Additionally, the amount of effort and care required to make a proper joint adds a substantial amount of time to the task. And, many of the operations are difficult to perform in the cramped and inaccessible areas where plumbing is usually found. There is the further consideration that these joints are usually permanent; if the piping needs to be rerouted, the joints and connecting pieces often must be cut off and discarded.

There are existing a number of designs of more easily assembled pipe joint assemblies, in which the pipe is simply pushed into the fitting to make a fluid-tight connection. Although such couplings function adequately, they typically require a number of coupling elements that must be specially manufactured by cutting or forming, and which then must be carefully assembled into the coupling in order for the coupling to function properly. Accordingly, these couplings are relatively expensive to manufacture.

SUMMARY OF THE INVENTION

It is therefore an object of this invention to provide an improved pipe coupling assembly that can be easily assembled and disassembled by unskilled workers, and that is relatively inexpensive to manufacture.

This invention in one embodiment features a coupling assembly for a first tubular member, comprising: a receiving member defining an opening adapted to receive the first tubular member, and having an inner portion defining an inner bore dimensioned to receive an end portion of the first tubular member, and an outer portion defining a first internal annular cavity communicating with the inner bore and having a diameter greater than the diameter of the inner bore; an annular locking member having an outer rim portion fitted within the first internal annular cavity, and having an inner portion of generally frustoconical shape angled inboard from its outer rim portion such that its inner rim extends in its relaxed position into the inner bore so that the inner rim contacts and penetrates the outer surface of the first tubular member when the first tubular member is inserted into the inner bore, to inhibit separation of the first tubular member from the receiving member; a stop member abutting the outboard side of the outer rim portion of the locking member and adapted to prevent the locking member from longitudinal outboard movement along the internal annular cavity; and a deformable annular sealing member within the receiving member inboard of the locking member, and extending in a relaxed position into the inner bore to contact the first tubular member when the first tubular member is inserted into the inner bore, to inhibit fluid leakage from the first tubular member toward the annular locking member.

The coupling assembly stop member may be a rigid annular stop member seated within the first internal annular cavity. This may include tongue members which project toward the inner bore to prevent the locking member inner portion from bending back toward the receiving member opening.

The locking member inner portion is preferably angled at less than 45° from a line perpendicular to the inner portion of the receiving member. It has been found that an angle of approximately 30° provides the best performance. The locking member inner rim may be slotted to allow the locking member to flex toward the receiving member opening.

The receiving member may further include an intermediate portion between the inner portion and the outer portion defining a second internal annular cavity which also communicates with the inner bore, and having a diameter greater than the diameter of the inner bore and less than the diameter of the first internal annular cavity. The sealing member, which may be an O-ring, may be seated in this second internal annular cavity. The receiving member may further define a shoulder between the second internal annular cavity and the inner bore, and an annular tapered wall portion between the shoulder and the inner bore to create a cavity adapted to accept a portion of the sealing member. This allows the sealing member to deform into the cavity as the first tubular member is inserted into the receiving member so that the deformable O-ring does not tear when the pipe is inserted into the coupling.

The assembly may further include an annular stay member between the locking member and the sealing member to prevent contact between the sealing member and the stay member. Especially at high pressures, the O-ring sealing member can be pressed against and extruded through the slots in the locking member inner rim. The annular stay member prevents this from happening.

The locking member inner rim may have a circumferentially-extending knife edge for penetrating the external wall of the first tubular member to inhibit longitudinal movement of the first tubular member relative to the receiving member. The receiving member may include a stop shoulder defining the inner end of the inner bore, the stop shoulder having an inner diameter smaller than the outer diameter of the first tubular member to stop inboard movement along the inner bore of the first tubular member.

BRIEF DESCRIPTION OF THE DRAWINGS

Other objects, features and advantages will occur to those skilled in the art from the following description of a preferred embodiment, and the accompanying drawings, in which.

DETAILED DESCRIPTION OF THE PREFERRED EMBODIMENT

Figure 1:
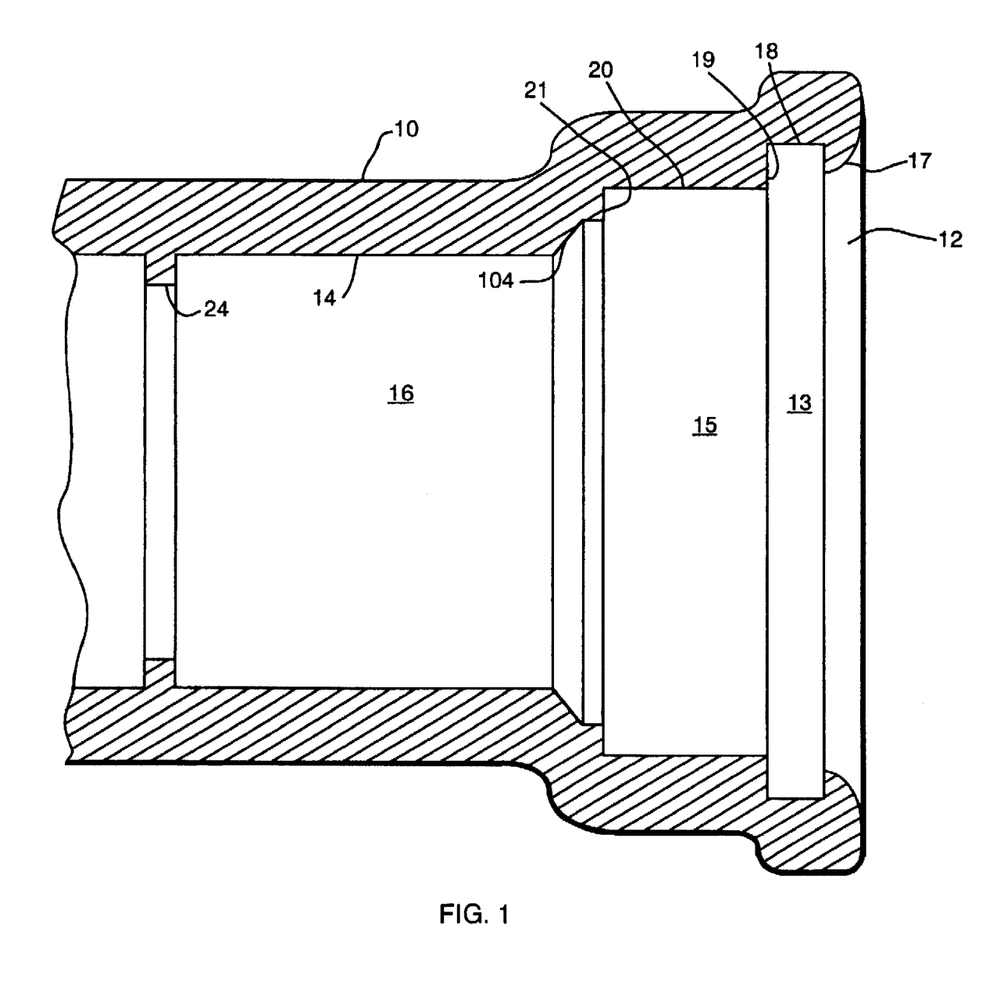
FIG. 1 is a longitudinal cross section through the receiving member of the preferred embodiment of the coupling assembly of this invention.
Figure 2:
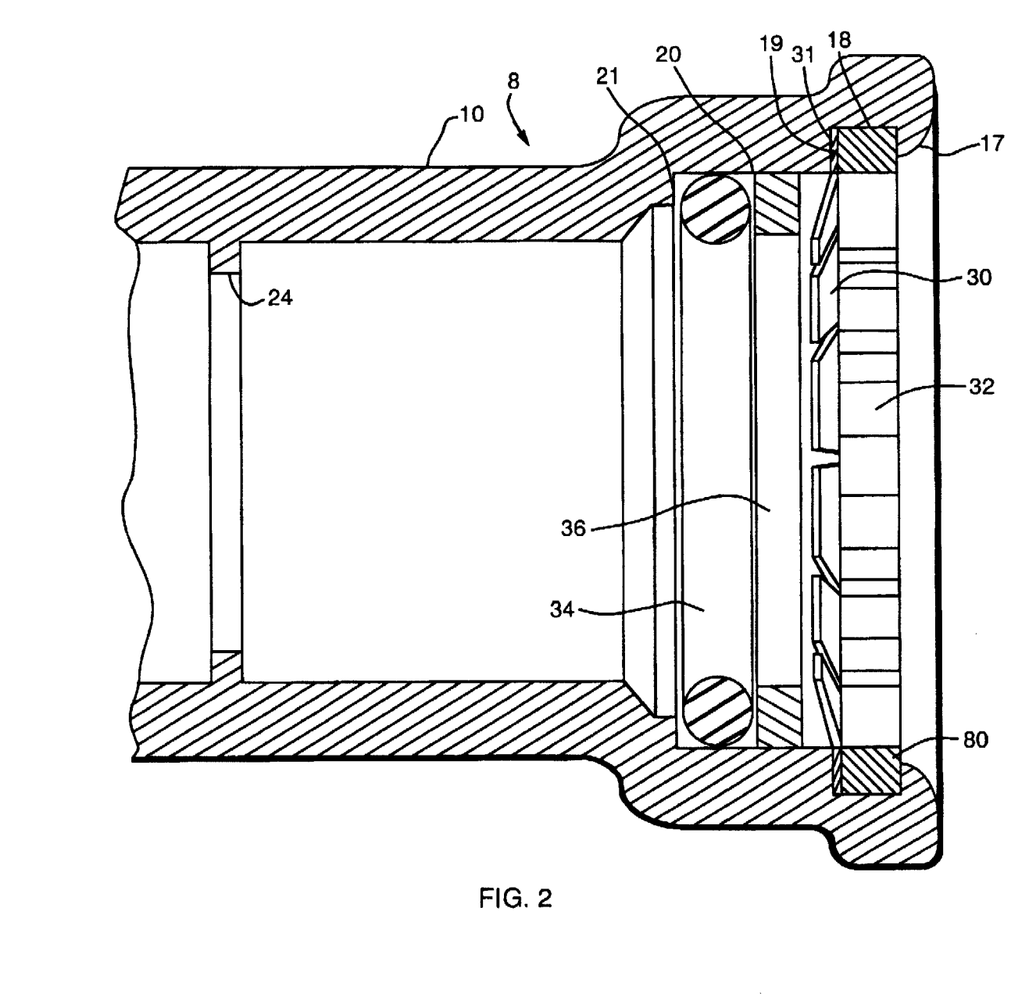
FIG. 2 is a longitudinal cross section through a coupling assembly including the receiving member of FIG. 1.

FIGS. 1 and 2 illustrate pipe coupling assembly 8 according to this invention. Coupling assembly 8 includes receiving member 10 which defines opening 12 adapted to receive a first tubular member, such as pipe or tube 100, FIGS. 6 and 7. Receiving member 10 includes inner portion 14 defining inner bore 16 which is dimensioned to snugly receive an end portion of the first tubular member. Receiving member 10 also includes outer portion 18 defining a first internal annular cavity 13 that communicates with inner bore 16. Cavity 13 has a diameter greater than the diameter of inner bore 16. Receiving member 10 also includes intermediate portion 20 which is between inner portion 14 and outer portion 18, and defines second internal annular cavity 15 that also communicates with inner bore 16. Cavity 15 has a diameter greater than the diameter of inner bore 16, and less than the diameter of first internal annular cavity 13. Shoulder 19 is defined between outer portion 18 and intermediate portion 20. Shoulder 21 is defined between intermediate portion 20 and inner portion 14. Stop shoulder 24 defines the end of inner bore 16, and serves as a stop for the pipe or tubing which is inserted into receiving member 10. For the purposes of the invention, no distinction is made between pipe and tubing, both being embraced by the word "pipe" herein.

Figure 4A:
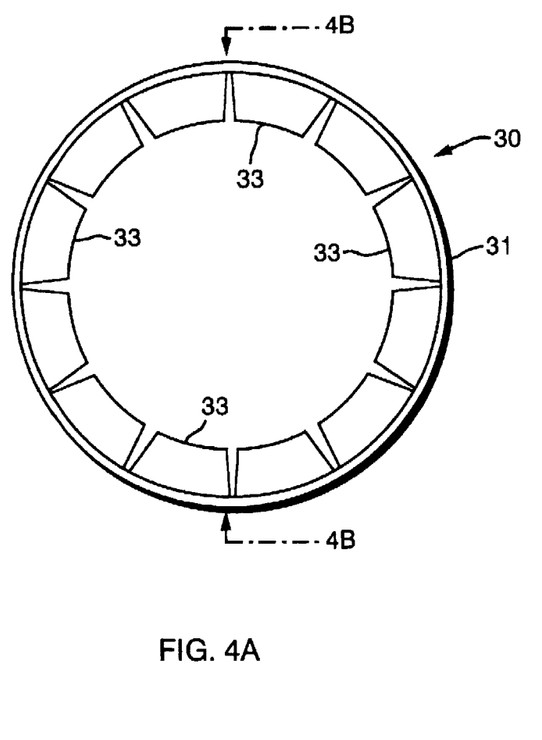
FIG. 4A is an end view of the annular locking member of the coupling assembly of FIG. 2.
Figure 4B:
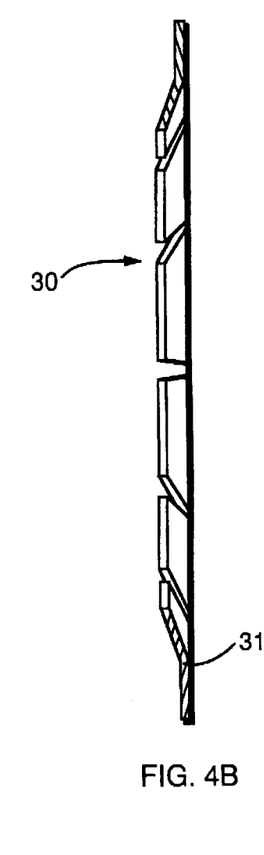
FIG. 4B is a cross sectional side view of the locking member of FIG. 4A, taken along line A—A.

Looking to FIG. 2, coupling assembly 8 includes annular locking member 30, annular stop member 32, deformable annular sealing member 34, and annular stay member 36. Annular locking member 30 is shown in more detail in FIGS. 4A, 4B, and 4C. Member 30 includes annular outer rim portion 31 which is fitted within first internal annular cavity 13, against outer portion 18. Annular locking member 30 inner rim portion 33 is of generally frustoconical shape, and is angled inboard toward shoulder 24 from outer rim portion 31. As is explained below, inner rim portion 33 is preferably angled at less than 45°, and ideally at about 30°, from axis "A" (FIG. 4C) along which outer rim portion 31 lies. It has been found that this angle provides the best grip on the pipe inserted into coupling assembly 8.

Figure 3:
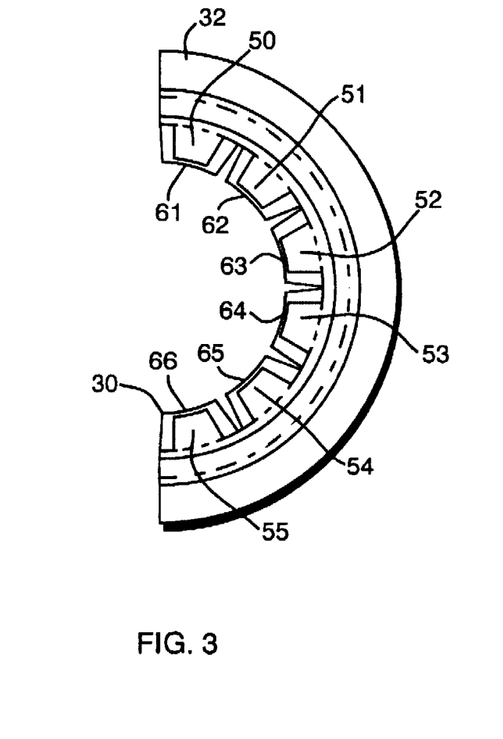
FIG. 3 is a partial end view of the coupling assembly of FIG. 2.
Figure 5:
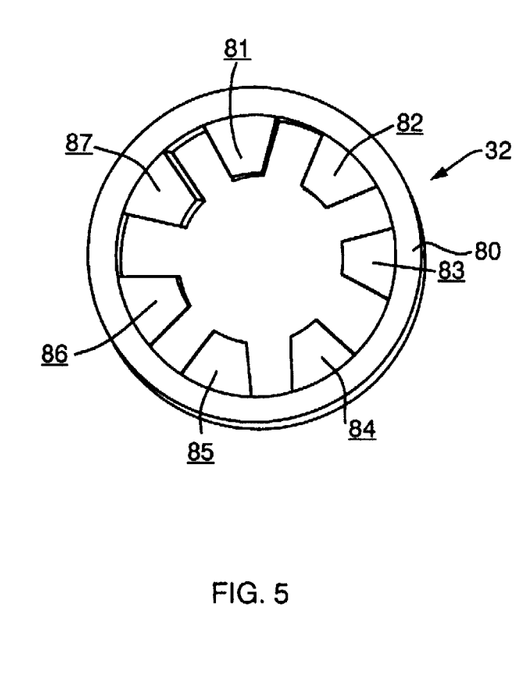
FIG. 5 is a front view of the stop member of the coupling assembly of FIG. 2.

Annular locking member 30 is held against shoulder 19 by annular stop member 32, which is shown in more detail in FIGS. 3 and 5. Stop member 32 has outer rim portion 80 that is about the same height as outer rim portion 31 of annular locking member 30. Stop member 32 is firmly held within outer portion 18 of receiving member 10. This may be accomplished by fabricating member 10 so that outer portion 18 initially is open to the end of receiving member 10 at opening 12, and then inserting members 30 and 32 into outer portion 18 against shoulder 19, and forming closing lip portion 17 by burnishing the edge of receiving member 10 to both finish the assembly and hold members 30 and 32 tightly in place.

Coupling assembly 8 also includes deformable annular sealing member 34 that is preferably a standard 0-ring which is disposed within intermediate portion 20. Annular stay member 36 may be a washer, and is placed between sealing member 34 and locking member 30 to prevent sealing member 34 from contacting inner portion 33 of locking member 30 under high pressure conditions, as explained more fully below in conjunction with FIG. 7.

Annular locking member 30 is stamped from a spring temper metal material such as 0.015" thick stainless steel. Member 30 has sufficient spring temper so that it's inner rim portion 33 can move from its relaxed position shown in FIG. 4C to the fully extended or straightened position shown in FIG. 7, and return without deformation to its rest position when the pipe is removed from the coupling. Annular locking member 30 has a number of slots along its inner rim portion 33 to define a number of projecting tongues as shown in FIG. 3, in which half of the tongues, 61 through 66, are visible. The slots allow inner rim portion 33 to flex back to the upright position shown in FIG. 7 without deforming locking member 30.

Figure 4C:
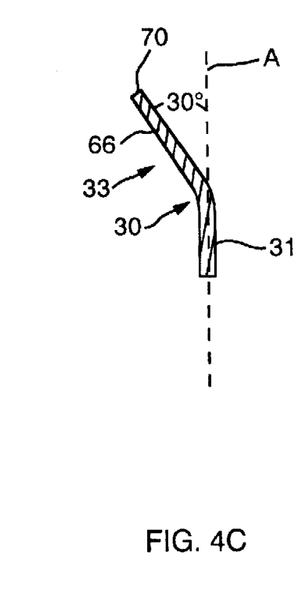
FIG. 4C is an enlarged partial cross sectional view of the annular locking member of FIGS. 4A and 4B.
Figure 6A:
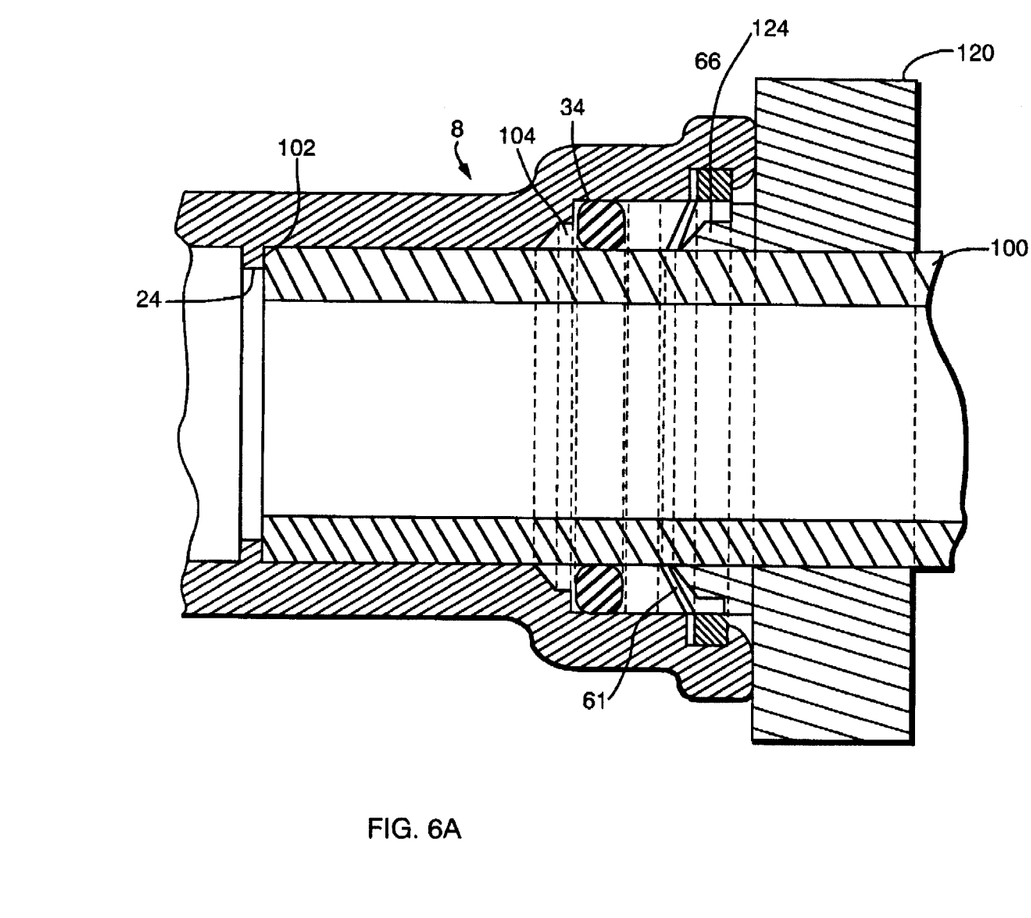
FIG. 6A is a cross sectional view of the pipe coupling assembly of FIG. 2 after assembly with a pipe, and including the coupling assembly disengagement tool.
Figure 6B:
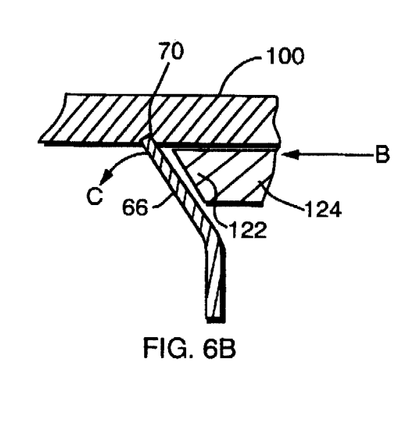
FIG. 6B is an enlarged cross sectional view of a portion of the assembly of FIG. 6A, detailing the pipe locking action of the assembly.

As shown in FIGS. 4C and 6B, inner rim portion 33 has projecting circumferential knife edge 70 that penetrates the outer surface of first tubular member 100 as shown in enlarged detail in FIG. 6B. This penetration prevents tubular member 100 from being withdrawn from coupling assembly 8.

Coupling assembly 8 is shown with tubular member 100 inserted therein in FIG. 6A. Inner portion 14 is sized so that it snugly receives the outside of pipe 100. End 102 of pipe 100 contacts stop shoulder 24, which projects into inner bore 16 more than the outer diameter of pipe 100. The deformable annular sealing member 34 is sized so that it projects slightly into inner bore 16 in the rest position shown in FIG. 2. Accordingly, member 34 is compressed and flattened by pipe 100 as shown in FIG. 6A to accomplish a fluid-tight seal that allows coupling assembly 8 to be used for both low and high pressure gas and liquid applications. Radially projecting cavity 104 that is formed between shoulder 21 and inner portion 14 allows sealing member 34 to deform inboard toward stop should 24 as pipe 100 is inserted into inner bore 16, so that sealing member 34 does not tear when the pipe is inserted into coupling assembly 8.

Figure 7:
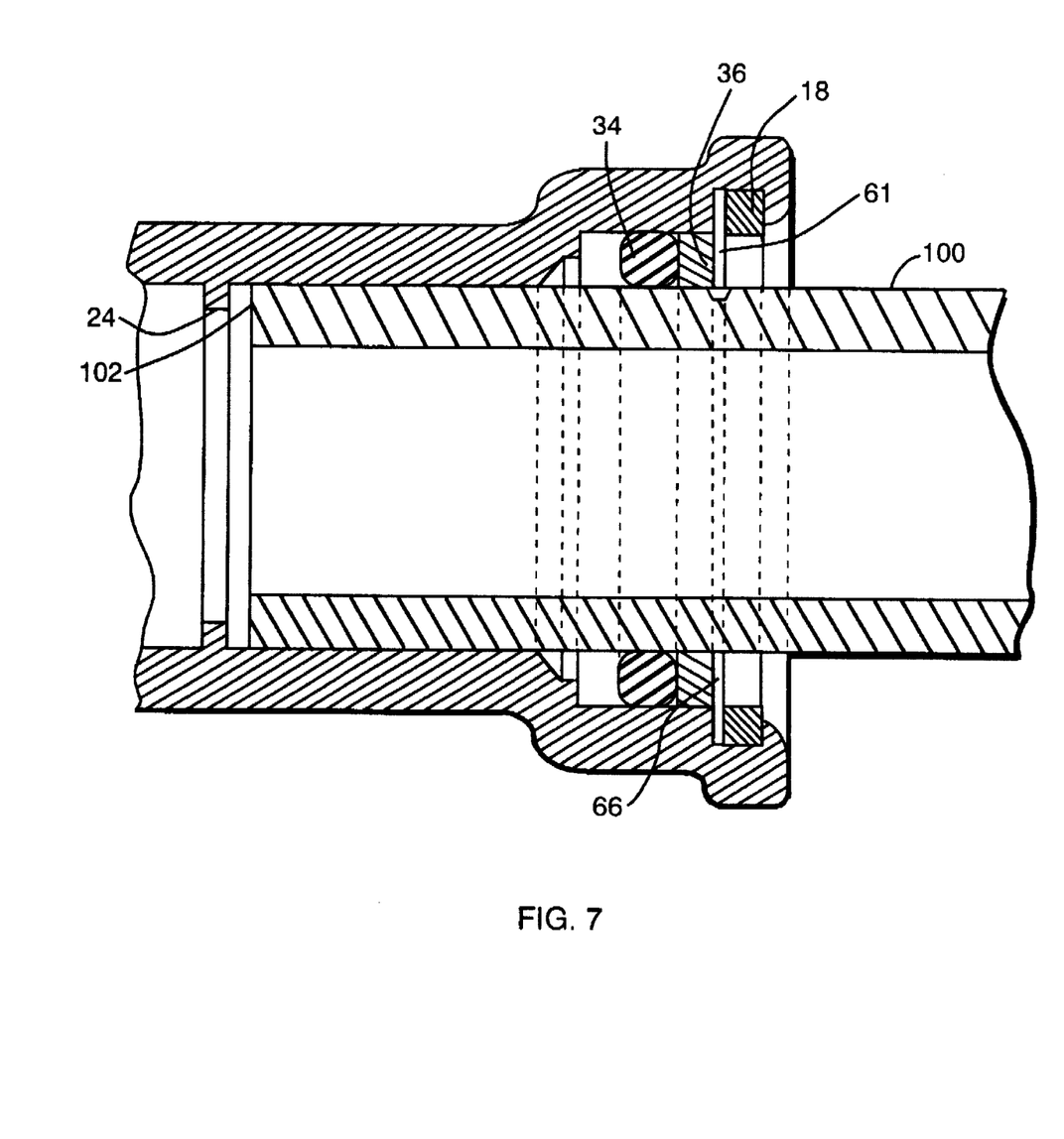
FIG. 7 is a cross sectional view of the assembly of FIG. 6A at high pressure.

Fluid pressure within tubular member 100 exerts a longitudinally directed force on member 100 to cause member 100 to move outboard toward opening 12 as shown in FIG. 7. This action causes inner rim portion 33 of locking member 30 to straighten towards axis A of outer portion 31, which causes knife edge 70 to dig further into the outer surface of pipe 100 to more firmly hold pipe 100 within coupling assembly 8. Thus, as the pressure in pipe 100 increases, pipe 100 is held even more firmly within coupling assembly 8.

Inner rim portion 33 of member 30 projects at an angle calculated to cause knife edge 70 to bite into the pipe surface. If the angle is too great, edge 70 will skid across the pipe. If it is too shallow, there is insufficient play to allow the rim portion to flex back a sufficient distance to dig the knife edge far enough into the pipe to hold at high pressure.

As can be seen by comparing FIGS. 6A and 7, as the pressure in pipe 100 is raised and pipe 100 moves slightly outboard, sealing member 34 and stay member 36 also slide outboard along intermediate portion 24 until stay member 36 contacts locking member 30, as shown in FIG. 7. At high pressures, sealing member 34 could be partially extruded through the slots in member 30. Stay member 36 prevents contact between sealing member 34 and locking member 30 to prevent such damage to sealing member 34, particularly at higher pressures.

Coupling assembly 8 is extremely simple and inexpensive to manufacture. Receiving member 10 may be molded with the shape shown in FIG. 1, with the exception of rounded nose portion 17, which can be formed later by deformation of the end of receiving member 10. Sealing member 34 and stay member 36 are then placed on intermediate portion 20, and locking member 30 and stop member 32 are placed on outer portion 18, and then lip 17 is deformed inward and against stop member 32 to finish the assembly.

Figure 8:
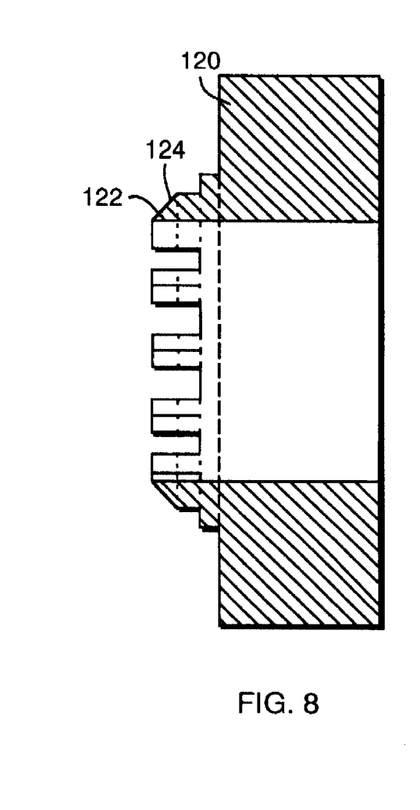
FIG. 8 is a partial longitudinal cross section through the coupling assembly of FIG. 2.

Disassembly of coupling assembly 8 requires the use of disengagement tool 120 which is shown in FIGS. 6A, 6B and 8. Disengagement tool 120 is preferably adapted to be slipped onto a pipe when the pipe is inserted into coupling assembly 8 in a manner similar to the disengagement tool detailed in U.S. Pat. No. 5,328,215, issued on Jul. 12, 1994. Tool 120 has projecting teeth such as tooth 124 with angled end portion 122. Teeth 124 are sized and spaced to fit in the openings between the tongue members of stop member 32. As shown in FIG. 3, stop member 32 has tongue members 50 through 55 with openings therebetween that are there to allow the teeth of the disengagement tool to fit through stop member 32 and contact inner rim portion 33 of annular locking member 30. As shown in the detail of FIG. 6B, end portion 122 is pushed inboard in the direction of arrow B up against tongue member 66 of locking member 30 to lift knife edge 70 out of tubular member 100. Disengagement tool 120 is thus used by pressing it into coupling assembly 8 until all of the tongues of inner rim portion 33 are lifted out of pipe 100, and then simply withdrawing pipe 100 from coupling assembly 8.

Coupling assembly 8 is thus simple and inexpensive to manufacture, and may be used by persons unskilled in traditional manners of pipe and tubing fitting. The coupling assembly can also be easily disassembled so that both the coupling assembly and the pipe can be reused, thus providing substantial savings in both labor and material costs for any and all types of pipe and tubing work.

Although specific features of this invention are shown in some drawings and not others, this is for convenience only as each feature may be combined with any or all of the other features in accordance with the invention.

Other embodiments will occur to those skilled in the art and are within the following claims.

What is claimed is:

1. A coupling assembly for a first tubular member, comprising:

a receiving member defining an opening adapted to receive said first tubular member, and having an inner portion defining an inner bore dimensioned to receive an end portion of said first tubular member, an outer portion defining a first internal annular cavity communicating with said inner bore and having a diameter greater than the diameter of said inner bore, and an intermediate portion between said inner portion and said outer portion defining a second internal annular cavity communicating with said inner bore and having a diameter greater than the diameter of said inner bore and less than the diameter of said first internal annular cavity;

an annular locking member having an outer rim portion fitted within said first internal annular cavity, and having a slotted inner portion of generally frustoconical shape angled inboard from its outer rim portion such that its inner rim extends in its relaxed position into said inner bore, said inner rim including a circumferentially-extending knife edge for penetrating the external wall of said first tubular member to inhibit longitudinal movement of said first tubular member relative to said receiving member;

a rigid annular stop member seated within said first internal annular cavity and abutting the outboard side of said outer rim portion of said locking member, including tongue members projecting toward said inner bore, to prevent longitudinal outboard movement of said locking member, and to prevent said locking member inner portion from bending back toward said receiving member opening;

a deformable longitudinally sliding annular sealing member seated in said second internal annular cavity, and extending in a relaxed position into said inner bore to contact said first tubular member when said first tubular member is inserted into said inner bore to inhibit fluid leakage from said first tubular member toward said annular locking member;

a longitudinally sliding stay member between said locking member and sealing member to prevent contact between said sealing member and said locking member and having an inner diameter nearly equal to the diameter of the inner bore; and a closing lip abutting the outboard side of said stop member to prevent said stop member from longitudinal outboard movement.

2. The coupling assembly of claim 1 in which said stop member includes tongue members projecting toward said inner bore to prevent said locking member inner portion from bending back toward said receiving member opening.

3. The coupling assembly of claim 2 in which said locking member is angled at approximately 30° from said line perpendicular to said inner portion of said receiving member.

4. A coupling assembly for a first tubular member, comprising:

a receiving member defining an opening adapted to receive said first tubular member; and having an inner portion defining an inner bore dimensioned to receive an end portion of said first tubular member, and an outer portion defining a first internal annular cavity communicating with said inner bore and having a diameter greater than the diameter of said inner bore;

an annular locking member having an outer rim portion fitted within said first internal annular cavity, and having a slotted inner portion of generally frustoconical shape angled inboard from its outer rim portion such that its inner rim extends in its relaxed position into said bore so that said inner rim contacts and penetrates the outer surface of said first tubular member when said first tubular member is inserted into said inner bore, to inhibit separation of said first tubular member from said receiving member;

a rigid stop member abutting the outboard side of said outer rim portion of said locking member and adapted to prevent said locking member from longitudinal outboard movement along said internal annular cavity, wherein said stop member is seated within said first internal annular cavity and includes tongue members projecting toward said inner bore to prevent said locking member inner portion from bending back toward receiving member opening;

a deformable longitudinally sliding annular sealing member within said second internal annular cavity inboard of said locking member, and extending in a relaxed position into said inner bore to contact said first tubular member when said first tubular member is inserted into said inner bore, to inhibit fluid leakage from said first tubular member toward said annular locking member; and a longitudinally sliding stay member between said locking member and said sealing member to prevent contact between said sealing member and said locking member.

5. The coupling assembly of claim 4 in which said receiving member further includes an intermediate portion between said inner portion and said outer portion defining a second internal annular cavity communicating with said inner bore and having a diameter greater than the diameter of said inner bore and less than the diameter of said first internal annular cavity.

6. The coupling assembly of claim 4 in which said locking member inner rim includes a circumferentially-extending knife edge for penetrating the external wall of said first tubular member to inhibit longitudinal movement of said first tubular member relative to said receiving member.

7. The coupling assembly of claim 4 in which said receiving member further includes a closing lip abutting the outboard side of said stop member to prevent said stop member from longitudinal outboard movement.

8. A coupling assembly for a first tubular member, comprising:

a receiving member defining an opening adapted to receive said first tubular member; and having an inner portion defining an inner bore dimensioned to receive an end portion of said first tubular member, an outer portion defining a first internal annular cavity communicating with said inner bore and having a diameter greater than the diameter of said inner bore, and an intermediate portion between said inner portion and said outer portion defining a second internal annular cavity communication with said inner bore and having a diameter greater than the diameter of said inner bore and less than the diameter of said first internal annular cavity;

an annular locking member having an outer rim portion fitted within said first internal annular cavity, and having a slotted inner portion of generally frustoconical shape angled inboard from its outer rim portion such that its inner rim extends in its relaxed position into said inner bore so that said inner rim contacts and penetrates the outer surface of said first tubular member when said first tubular member is inserted into said inner bore, to inhibit separation of said first tubular member from said receiving member;

a stop member abutting the outboard side of said outer rim portion of said locking member and adapted to prevent said locking member from longitudinal outboard movement along said internal annular cavity;

a deformable longitudinally sliding annular sealing member within said second internal annular cavity inboard of said locking member, and extending in a relaxed position into said inner bore to contact said first tubular member when said first tubular member is inserted into said inner bore, to inhibit fluid leakage from said first tubular member toward said annular locking member; and a longitudinally sliding stay member said locking member and said sealing member to prevent contact between said sealing member and said locking member; and wherein said receiving member further defines a shoulder between said second internal annular cavity and said inner bore, and an annular tapered wall portion between said shoulder and said inner bore, creating a tapered cavity adapted to accept a portion of said sealing member to allow said sealing member to deform as said first tubular member is inserted into said receiving member.

9. The coupling assembly of claim 8 in which said stop member is a rigid annular stop member seated within said first internal annular cavity.

10. The coupling assembly of claim 8 in which said sealing member and stay member are seated in said second internal annular cavity.

11. The coupling assembly of claim 8 in which said stay member is an annular washer.

12. The coupling assembly of claim 8 in which said receiving member includes a stop shoulder defining the inner end of said inner bore, said stop should have an inner diameter smaller than the outer diameter of said first tubular member to stop the inboard movement along said inner bore of said first tubular member.

13. The coupling assembly of claim 8 in which said receiving member includes a flange defining the inner end of the outer portion upon which to seat said locking member.

14. A coupling assembly of claim 8 in which said stay member has an inner diameter nearly equal to the diameter of the inner bore.

15. A coupling assembly of claim 8 in which said stay member has a rectangular cross-section.

* * * * *